(12) United States Patent
Zamuner

(10) Patent No.: US 6,610,963 B2
(45) Date of Patent: Aug. 26, 2003

(54) ERGONOMIC HANDLE ATTACHMENT FOR WELDING TORCH

(76) Inventor: Frank Zamuner, 1110 Dundas Street West, Oakville, Ontario (CA), L6J 4Z2

( * ) Notice: Subject to any disclaimer, the term of this patent is extended or adjusted under 35 U.S.C. 154(b) by 8 days.

(21) Appl. No.: 09/794,494

(22) Filed: Feb. 28, 2001

(65) Prior Publication Data
US 2001/0025837 A1 Oct. 4, 2001

(30) Foreign Application Priority Data
Mar. 1, 2000 (GB) ............................................ 0004892

(51) Int. Cl.[7] ................................................ B23K 9/00
(52) U.S. Cl. .................. 219/137.31; 219/136; 219/144
(58) Field of Search .......................... 219/137.31, 136, 219/144; 15/143.1; 16/430; 81/489

(56) References Cited

U.S. PATENT DOCUMENTS

| 1,296,358 | A | * | 3/1919 | Bowers ...................... 219/144 |
| 2,118,274 | A | * | 5/1938 | Sweda ........................ 219/142 |
| 2,438,792 | A | * | 3/1948 | Sandrik ............................ 2/17 |
| 3,968,341 | A |   | 7/1976 | Manning .................... 219/132 |
| 4,038,719 | A |   | 8/1977 | Bennett ....................... 16/430 |
| 4,161,643 | A | * | 7/1979 | Martin, Jr. et al. ........... 219/70 |
| 4,885,818 | A |   | 12/1989 | Arterbury .................... 16/430 |
| D334,517  | S |   | 4/1993 | Ingwersen et al. ............. D8/29 |
| D347,643  | S |   | 6/1994 | Burgin et al. .................. D8/30 |
| 5,338,917 | A | * | 8/1994 | Stuart et al. ........... 219/137.63 |
| 5,571,427 | A |   | 11/1996 | Dimock et al. ................ 219/75 |
| 5,595,671 | A |   | 1/1997 | David .................... 219/137.62 |
| 5,706,553 | A |   | 1/1998 | Riley et al. ................. 16/111.1 |
| 5,709,596 | A |   | 1/1998 | Alexander et al. .......... 451/357 |
| 5,828,052 | A |   | 10/1998 | Reynolds et al. ...... 235/472.01 |
| 5,829,099 | A |   | 11/1998 | Kopelman et al. ............. 16/430 |
| 5,850,663 | A |   | 12/1998 | Hardy et al. .............. 15/236.01 |
| 5,854,461 | A | * | 12/1998 | Sorenson ..................... 219/136 |
| 5,916,465 | A |   | 6/1999 | New et al. ................... 219/138 |
| 6,161,256 | A | * | 12/2000 | Quiring et al. ............... 16/431 |

* cited by examiner

Primary Examiner—Kuang Y. Lin
Assistant Examiner—Kevin P. Kerns
(74) Attorney, Agent, or Firm—Anthony Asquith & Co.

(57) ABSTRACT

The attachment provides an overhandle, which overlies the handle of the torch, thereby creating a tapering space. The welder places the first web area of the hand into the space, whereupon the connection between the hand and the torch is made more secure. The welder can manipulate the torch, without the need to exert a constant tight gripping force on the torch. The attachment includes side-cheeks which provide even more of a constraining connection between the hand and the torch. The attachment is adjustable as to position and angle with respect to the torch.

15 Claims, 2 Drawing Sheets

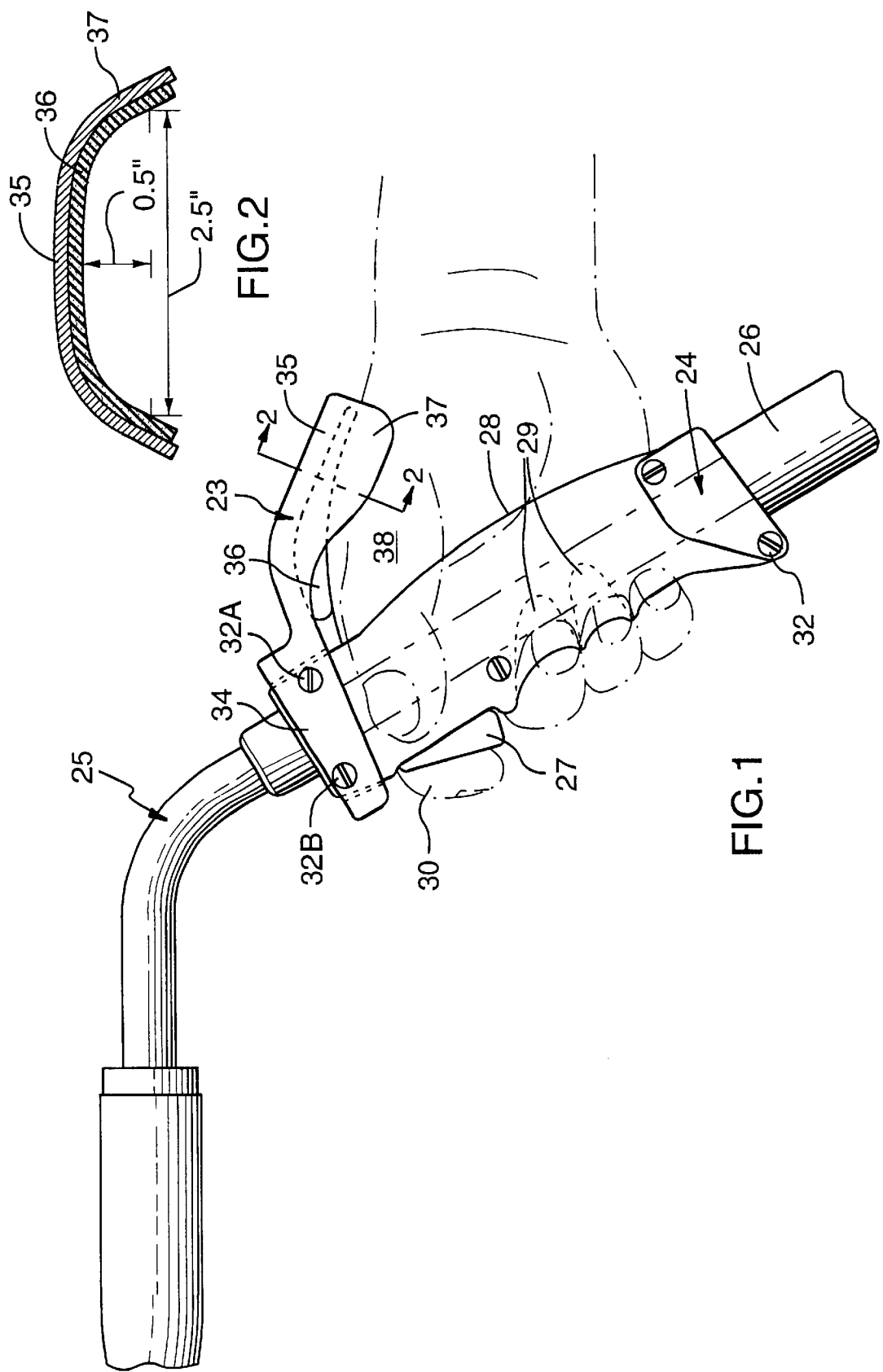

ERGONOMIC HANDLE ATTACHMENT FOR WELDING TORCH

This invention relates to welding torches, of the kind that are used by welders in industry, where the torch is intended to be held in the hand of the welder for hours at a stretch. It is all too often the case that the welder develops painful symptoms, or at least fatigue, in the hand and wrist, from holding the torch. It is not so much that the torch is heavy in itself, but the problem is that the torch has a hose or pipe connecting it to the welding service center, and this hose can impose a constant drag on the torch, making the torch cumbersome and difficult to manipulate.

BACKGROUND TO THE INVENTION

It is part of the welding torch operator's task to hold the torch, in his hand, perhaps for hours. The service hose of the torch contains the electricity supply, the consumable welding wire, the inert-gas supply, the cooling water circulation conduits, and perhaps a vacuum suction hose for extracting the fumes, which, even to the habitual expert welder, can make the torch seem extremely heavy after a while.

One of the problems is that the welder must grip the torch handle in his hand, and must grip it quite tightly, in order to manipulate the torch and hose, and to hold the torch in position. Plus, it is in the nature of welding that the grip must be maintained at all times: the torch cannot be held steady, by resting the torch against something. It is also recognized that much of the fatigue of the hands experienced by welders arises rather from the need to maintain a tight gripping hold on the torch, using the fingers of the torch hand, in order to maintain the correct orientation of the torch, than from actually moving and positioning the torch, using the wrist.

Previous attempts to make it easier to grip the torch handle have been in the areas of making the handle curved to better fit the natural shape of the hand, or of having recessed finger grips moulded into the (plastic) handle.

THE INVENTION IN RELATION TO THE PRIOR ART

The invention is aimed at taking away the need for the welder to grip the torch handle. The invention provides an over-handle attachment, which enables the welder to slide the first web area of his hand, i.e. the web area between the thumb and forefinger, into the space between the torch handle and the overhandle, and the overhandle is so designed that this space receives the first web area, and (slightly) squeezes the first web area. In the conventional torch handle, the welder's hand and the torch could only be integrated into a manipulative whole unit when the welder gripped the handle tightly; with the handle attachment of the invention, the welder's hand and the torch can form an integrated manipulative unit without the need for the welder to grip the torch handle.

Of course, many different types of articles are adapted to be held in the hand, and to be manipulated by a person. Handles and grips have been designed for all kinds of specialized functions. The present invention is aimed specifically at making it possible for a welder to complete a long period of work without hand-fatigue, recognizing that the major cause of hand fatigue in welders has been the constant drag of the hose that connects the torch to the service center. The welder not only has to support the weight of the torch, but the presence of the hose means that the welder also has to exert a forceful grip on the torch, to maintain the torch in its correct orientation, against the constant drag or pull of the hose, and it is this latter requirement that is mainly responsible for the fatigue. Basically, if the hose were not present, there would be no need for the invention.

It might be considered that one way in which the welder's hand might be attached to the torch, without the need for the welder to grip the torch, would be for the torch to be strapped to the welder's hand. However, this would not be advisable. Welding can be dangerous, in that accidents, especially electrical accidents, occur all too frequently, usually due to the welder not paying full attention to the task. The welder must be able to set the torch down, and withdraw his hand, with a minimum of impediment from the torch itself. The handle attachment as described herein is aimed at creating a firm, secure, unity of the welder's hand with the torch, and yet is aimed at making it possible for the welder to release the torch immediately from his hand, should the occasion arise.

Welding accidents and injuries can be the subject of liability payments, and one aim of the invention is to reduce exposure to such payments. One of the common injuries suffered by welders, for which compensation payments are often sought, is muscle strain in the hands, which is what the invention seeks to reduce.

DETAILED DESCRIPTION OF PREFERRED EMBODIMENTS

By way of further explanation of the invention, exemplary embodiments of the invention will now be described with reference to the accompanying drawings, in which:

FIG. 1 is a side elevation of a welding torch with a handle-attachment that embodies the present invention.

FIG. 2 is a cross-section on line 2—2 of FIG. 1.

Figure 3:
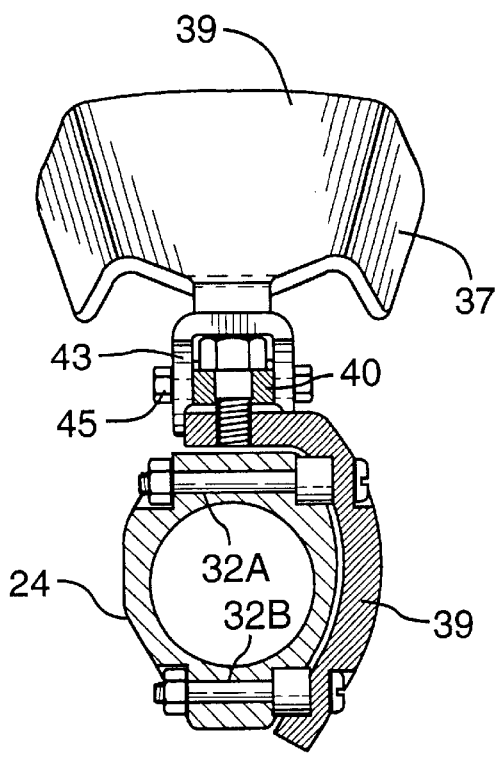
FIG. 3 is a front elevation of a welding torch with another design of handle-attachment.

The apparatuses shown in the accompanying drawings and described below are examples which embody the invention. It should be noted that the scope of the invention is defined by the accompanying claims, and not necessarily by specific features of exemplary embodiments.

FIG. 1 shows an ergonomic handle attachment 23, attached to the handle 24 of a MIG welding torch 25. A service hose 26 connects the torch to the service center (not shown) that houses the electrical supply, gas supply, welding rod feed mechanism, cooling water supply and return, fume suction, etc. These items are activated by the trigger 27 of the torch.

The handle 24 of the torch 25 is conventional, in itself. Conventional welding torch handles are to some extent ergonomically shaped. The top surface of the handle is humped, as shown at 28, to fit the hollow of the palm of the hand. Also, the undersurface of the handle carries finger-indentations 29, to allow the middle, ring, and little, fingers to grip the handle with a minimum of muscular squeezing. The handle 24 is designed so that the forefinger 30 falls naturally onto the trigger 27. The handle is not handed—i.e the one handle serves both left-handed and right-handed welders.

Even though some design effort has been put into the design of the conventional handle 24, directed towards making the handle comfortable to grip, still the need arises for the welder to maintain that grip by muscular effort.

As shown in FIG. 1, an ergonomic handle attachment, or over-handle, 23 has been bolted onto the front end of the handle 24.

The over-handle 23 overlies the area of the welder's hand between the thumb and the forefinger. This is known as the first web area. In this area, the first dorsal inteross muscle runs from the base of the thumb to the forefinger, while the adductor pollicis muscle pulls the other way, i.e from the base of the forefinger onto the thumb.

When the over-handle 23 is present, the welder holds the handle 24 of the torch in the normal way, with the palm of the hand lying along the humped top of the handle, the thumb to one side, and the fingers underneath. The presence, now, of the over-handle means that the first web area is engaged between the over-handle 23 and the handle 24. (FIG. 1 shows the welder's bare hand, for clarity: of course, welders normally wear thick protective gauntlets.)

It is recognised that the above-mentioned muscles in the first web area are substantially not inhibited in their normal functioning, even over a period of several hours at a time, by the presence of the over-handle 23. The over-handle can be so shaped and positioned that the welder can manipulate and manhandle the torch 25, with the hose 26 attached, without exerting any muscular squeeze or grip on the torch handle 24. That is to say, the fingers and thumb of the torch hand can be actually held clear of the torch, and yet still the first web area of the hand is sufficiently securely held to the torch as to permit the required precision and security of movement control of the torch as is needed in the welding operation. As a result, the welder can more or less completely relax his encircling grip on the torch.

It should be noted, however, that the invention is aimed at reducing the need for the welder to grip the handle, not at eliminating that need completely. Of course, the welder still needs to have his fingers present in an encircling configuration on the torch handle, to operate the trigger 27. The point is that, when the over-handle 23 is present, he substantially need not squeeze-grip the torch handle with his fingers.

As to its structure, the over-handle can be attached as an accessory, to an existing torch handle. The over-handle may be simply clamped around the handle-moulding of the torch. Or, as shown in FIG. 1, the over-handle may be secured to the torch handle 24 by the screws 32. Conventional torch handles generally are manufactured as two plastic half-mouldings, which are held together by a number of screws. The layout of the screws varies, but virtually every MIG torch handle has a pair of screws at the front end, disposed as at 32A,32B.

To secure the over-handle, first these two screws are taken out of the torch; then, the over-handle is located in position over the holes at 32A,32B, and then two longer screws are inserted. The over-handle should be attached in a way that still enables the screws to clamp the two moulded halves of the handle firmly together.

Extending from the fixing or attachment area 34 of the over-handle, the over-handle includes the hand-grip area 35. This area is curved slightly, to follow the general shape of the first web area of the hand. The (concave) inside-facing surface of the hand-grip area 35 has a foam-rubber cushion 36, for extra comfort, and for a little extra grip, but this is not essential.

Side cheeks 37 are provided on the sides of the hand-grip area 35, which curve downwards rather more steeply than the gentle curvature of the central portion of the hand-grip area 35. As shown in FIG. 2, the cheeks 37 are about 2.5 inches apart, measured at a level 0.5 inches down from the middle of the undersurface of the hand-grip area 35, as shown in the cross-section 2—2 (FIG. 2). The cheeks 37 serve to encase the welder's hand laterally to some extent. This lateral restraint is useful, in that it is added to the main restraint function of the over-handle, i.e of squeezing the first web area between the over-handle and the top surface of the torch handle.

The term squeezing, in the above context, should not be understood as implying tightness to the point of discomfort. Rather, it means that the first web area of the welder's hand is subjected to a slight compression. It is recognized, in the invention, that the first web area is able to be squeezed, in this sense, with enough force to make a large contribution to elimination of the need to grip the torch handle, but at the same time the squeeze force is small enough to cause substantially no discomfort, and no interference with the normal movements of the hand. The squeezing of the first web area between the over-handle and the torch handle is almost imperceptibly gentle when compared with the extent to which a welder had to grip the torch handle when the over-handle was not present.

The squeeze-grip the torch, with the over-handle attached, makes on the first web area of the welder's hand, though light enough to cause no discomfort, is nevertheless quite strong, mainly because the squeeze-grip is applied as a uniform light pressure over what amounts to quite a large area of the hand. Unless the over-handle is mis-sized for the particular welder's hand, the squeeze-grip is secure enough that the welder can even hold the torch vertically, i.e tip down, and still not need to exert any encircling grip on the handle with his muscles.

The over-handle, as a product, can be marketed on a one-size-fits-all basis. Of course, welder's hands vary in size, and the thickness of the first web area can be considerably thicker in (large) person A than in (small) person B. However, the thickness of the first web area tends to increase progressively, further up the hand, whereby a thin hand simply fits a little more closely into the crook of the over-handle than a thicker hand; in either case, i.e thin or thick, the welder's first web area is received snugly into the space between the over-handle and the torch handle. As shown in FIG. 1, the space 38 between the cushion 36 and the humped upper surface 28 of the torch handle is a space that correspondingly increases in thickness. That is to say, the space is generally truncated-wedge-shaped, as shown in the FIG. 1 view.

Figure 4:
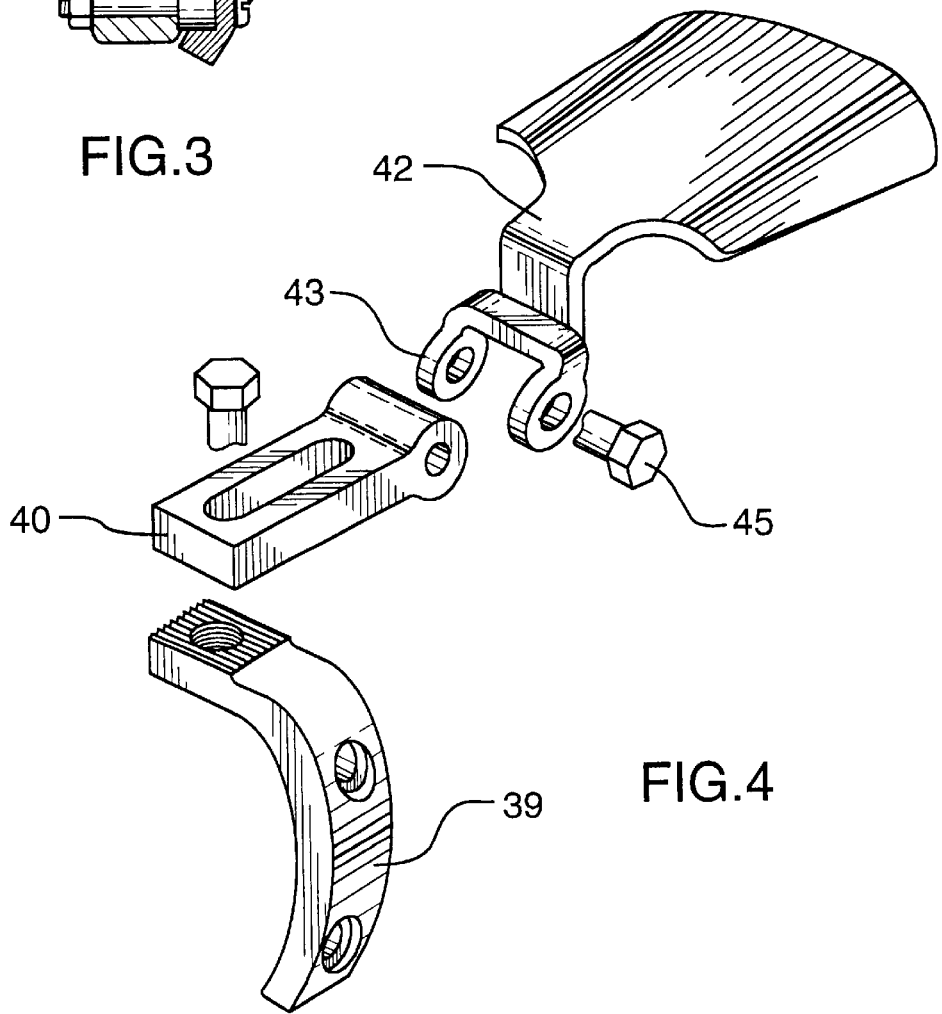
FIG. 4 is a pictorial view, showing the components of the handle-attachment of FIG. 3.

It may be preferred to make the over-handle adjustable. FIGS. 3 and 4 show one way in which adjustability can be provided.

It is recognized that one of the key adjustabilities is to make the over-handle adjustable as to its position longitudinally along the torch handle. In FIGS. 3 and 4, a clamp component 39 is bolted to the torch handle, using the lengthy screws technique, as described, although now the clamp component 39 only occupies one side of the torch. A slider component 40 is bolted to the top surface of the clamp component; serrations permit the clamp and slider components to be locked together at a suitable position. The clamp and slider components may be moulded in plastic.

The over-handle also includes a plate component 42, which is able to rotate relative to the slider component 40. Radial serrations around the lugs 43 of the plate component 42 serve to lock the plate and slider components together when the bolt 45 is tightened. The plate component 42 can be formed from sheet metal, for example sheet aluminum.

Thus, the over-handle as shown in FIGS. 3 and 4 can be adjusted as to the position of the plate component 42 longitudinally along the torch handle 24, and as to the wedge angle the plate component 42 makes with the top surface of the torch handle.

There are other ways in which the over-handle can be made adjustable. For example, the holes at 32A,32B can be slotted; or a series of holes may be provided, from which the user selects the ones that give the best fit.

As mentioned, the over-handle is intended to squeeze (in the above sense) the first web area; this enables the hand to be "locked" into the torch, whereby the torch can be manipulated by movements of the welder's wrist and arm, without the need for the welder to maintain a constant gripping force on the handle of the torch. The side-cheeks 37 of the over-handle also provide another means whereby the hand is locked into the torch, and the effect caused by the side-cheeks is aggregated onto the effect caused by the squeezing of the first web area. The effect of the over-handle is to make it much easier for the welder to accomplish a full shift of work, without the muscles of his hand and fingers becoming fatigued.

The over-handle preferably should be reasonably light in weight. On the other hand, as mentioned, it is mainly the drag of the service hose, not the weight of the torch itself, that makes the torch so tiring to handle. Therefore, the design of the over-handle need not be compromised, just to achieve an ultra-lightweight unit. Welding torches generally are subjected to knocks and abuse, whereby if a component of a welding torch is to be made from plastic, the component had better be chunky in shape, and that is not true of the over-handles as depicted. So, preferably, the over-handle is made from metal, for example aluminum. However, the over-handle may be moulded in plastic.

Another function of the over-handle is to serve as protection against splashes and sparks from the welding area. It will be noted that the over-handle does indeed shroud the parts of the welder's hand that might be expected to be most likely to be splashed.

The hand-grip-component and the torch-handle are symmetrical about a left-right central plane.

What is claimed is:

1. Ergonomic over-handle, in combination with a welding torch having a torch-handle and having a service cable attached at a rear end thereof, wherein:

the over-handle includes an attachment-component, and the attachment-component makes physical contact with, and is fixedly attached to, the torch, at a point of attachment;

the said point of attachment between the attachment-component of the over-handle and the torch occurs at a location that is in front of the torch-handle;

the over-handle includes a hand-grip component, and the hand-grip component extends rearwards from the attachment-component;

the torch-handle includes a top-surface, and the hand-grip component overlies, and is spaced from, the said top-surface of the torch-handle;

the hand-grip component is so disposed in relation to the torch-handle as to create a space, between the top-surface of the torch-handle and an undersurface of the hand-grip component;

the space thus created is so shaped and sized as to be capable of, and suitable for, receiving the first web area of the hand of a person, into that space, the first web area being the webbed area between the thumb and the forefinger;

the space thus created is so shaped and sized as to be capable of, and suitable for, exerting a slight squeeze-grip upon the first web area of a person's hand, when the first web area is located in the said space;

the over-handle is open at the sides of the hand-grip component, to the extent that, when the first web area of a person's hand is located in the said space, the fingers of the hand can lie to the right side of the torch-handle, and the thumb of the hand can lie to the left side of the torch-handle;

the shape of the over-handle is such that, when the first web area of a person's hand is located in the said space, the attachment-component lies in front of the first web area;

and the configuration of the space created between the top-surface of the torch-handle and the undersurface of the hand-qrip component is such that, when the first web area of a hand is located in the said space, the first web area is gripped between the top-surface of the torch-handle and the undersurface of the hand-grig component securely enough that the person can manipulate and manhandle the torch, with the service cable attached, substantially without exerting any muscular squeeze or grin on the torch-handle.

2. Combination of claim 1, wherein:

the torch-handle and the hand-grip component have respective left and right halves, which define a central plane;

the halves are symmetrical about the central plane.

3. Combination of claim 1, wherein:

the torch and the over-handle have respective left and right halves, which define a plane;

in a cross-sectioned side view of the torch, taken on the said plane, the said space created between the top-surface of the torch-handle and the undersurface of the hand-grip component, has a truncated-wedge-shaped, tapering, configuration, being narrower towards the forward end of the torch;

whereby, when the first web area of a hand is located in the said space, the first web area lies closer to the said point of attachment, when the first web area is thin, than when the first web area is thick.

4. Combination of claim 1, wherein the configuration of the over-handle is such that, when the first web area of a hand is located in the said space, the attachment-component lies between the thumb and forefinger of the hand.

5. Combination of claim 1, wherein the configuration of the over-handle is made complementary to the configuration of the torch-handle, to the extent that the top-surface of the torch-handle and the undersurface of the hand-grip component touch the first web area of a hand located in the said space, over a substantially large and un-concentrated area.

6. Combination of claim 1, wherein:

the attachment-component includes a fastening-means, for fastening the over-handle to the torch;

the fastening means is such that the over-handle can be detached from, and re-attached to, the torch, as an accessory unit.

7. Combination of claim 6, wherein:

the torch handle is of the type that is formed in left and right half-mouldings in plastic, and the half-mouldings have respective complementary fastening-holes, and the half-mouldings are secured together by bolts passing through these fastening-holes;

the attachment-component includes holes, which are complementary to the said fastening-holes, and screws, which pass right through the fastening-holes in the half-mouldings and the holes in the attachment-component.

8. Combination of claim 1, wherein the combination includes an adjusting-means, for adjusting the configuration of the said space.

9. Combination of claim 8, wherein the arrangement of the adjusting-means is such that the over-handle can be adjusted as to the position of the hand-grip component longitudinally along the torch handle.

10. Combination of claim 8, wherein:

the undersurface of the hand-grip component forms a wedge-angle with respect to the top surface of the torch handle;

the arrangement of the adjusting-means is such that the over-handle can be adjusted as to the said wedge-angle.

11. Combination of claim 1, wherein:
the torch and the over-handle have respective left and right halves, which define a plane;
in a cross-sectioned side view of the torch, taken on the said plane, the said space created between the top-surface of the torch-handle and the undersurface of the hand-grip component, has a truncated-wedge-shaped, tapering, configuration, being narrower towards the forward end of the torch;
whereby, when the first web area of a hand is located in the said space, the first web area lies closer to the said point of attachment, when the first web area is thin, than when the first web area is thick;
the top-surface of the torch-handle is humped, to fit the palm of a hand gripping the handle;
the undersurface of the hand-grip component is curved, being concave in the area of the undersuface that touches the first web area of the hand;
the configuration of the over-handle is such that, when the first web area of a hand is located in the said space, the attachment-component lies between the thumb and forefinger of the hand;
the configuration of the over-handle is made complementary to the configuration of the torch-handle, to the extent that the top-surface of the torch-handle and the undersurface of the hand-grip component touch the first web area of a hand located in the said space, over a substantially large and un-concentrated area.

12. Combination of claim 1, wherein:
the welding torch includes an operating switch, located in the torch-handle;
the switch is so located in the torch that the person can operate the switch while the person's hand is placed with the fingers to the right side and the thumb to the left side of the torch-handle.

13. Ergonomic over-handle, in combination with a welding torch having a torch-handle and having a service cable attached at a rear end thereof, wherein:
the over-handle includes an attachment-component, and the attachment-component makes physical contact with, and is fixedly attached to, the torch, at a point of attachment;
the said point of attachment between the attachment-component of the over-handle and the torch occurs at a location that is in front of the torch-handle;
the over-handle includes a hand-grip component, and the hand-grip component extends rearwards from the attachment-component;
the torch-handle includes a top-surface, and the hand-grip component overlies, and is spaced from, the said top-surface of the torch-handle;
the hand-grip component is so disposed in relation to the torch-handle as to create a space, between the top-surface of the torch-handle and an undersurface of the hand-grip component;
the space thus created is so shaped and sized as to be capable of, and suitable for, receiving the first web area of the hand of a person, into that space, the first web area being the webbed area between the thumb and the forefinger;
the space thus created is so shaped and sized as to be capable of, and suitable for, exerting a slight squeeze-grip upon the first web area of a person's hand, when the first web area is located in the said space;
the over-handle is open at the sides of the hand-grip component, to the extent that, when the first web area of a person's hand is located in the said space, the fingers of the hand can lie to the right side of the torch-handle, and the thumb of the hand can lie to the left side of the torch-handle;
the shape of the over-handle is such that, when the first web area of a person's hand is located in the said space, the attachment-component lies in front of the first web area;
the top-surface of the torch-handle is humped, to fit the palm of a hand gripping the torch-handle;
the undersurface of the hand-grip component is curved, being concave in the area of the undersurface that touches the first web area of the hand.

14. Ergonomic over-handle, in combination with a welding torch having a torch-handle and having a service cable attached at a rear end thereof, wherein:
the over-handle includes an attachment-component, and the attachment-component makes physical contact with, and is fixedly attached to, the torch, at a point of attachment;
the said point of attachment between the attachment-component of the over-handle and the torch occurs at a location that is in front of the torch-handle;
the over-handle includes a hand-grip component, and the hand-grip component extends rearwards from the attachment-component;
the torch-handle includes a top-surface, and the hand-grip component overlies, and is spaced from, the said top-surface of the torch-handle;
the hand-grip component is so disposed in relation to the torch-handle as to create a space, between the top-surface of the torch-handle and an undersurface of the hand-grip component;
the space thus created is so shaped and sized as to be capable of, and suitable for, receiving the first web area of the hand of a person, into that space, the first web area being the webbed area between the thumb and the forefinger;
the space thus created is so shaped and sized as to be capable of, and suitable for, exerting a slight squeeze-grip upon the first web area of a person's hand, when the first web area is located in the said space;
the over-handle is open at the sides of the hand-grip component, to the extent that, when the first web area of a person's hand is located in the said space, the fingers of the hand can lie to the right side of the torch-handle, and the thumb of the hand can lie to the left side of the torch-handle;
the shape of the over-handle is such that, when the first web area of a person's hand is located in the said space, the attachment-component lies in front of the first web area;
the over-handle includes left and right side-cheeks, which depend from the sides of the hand-grip component, and which are so arranged as to provide comfortable constraint for the area of the hand lying to the sides of the first web area, of a hand located in the said space.

15. Combination of claim 14, wherein:
the hand-grip-component and the torch-handle are symmetrical about a left-right central plane;
the side-cheeks are about 2½ inches apart, measured at a level ½-inch down from a point in the left-right central plane, on the undersurface of the hand-grip component.

* * * * *